United States Patent

[11] 3,607,665

[72] Inventor Ronald S. Rogers
 Bartlesville, Okla.
[21] Appl. No. 823,693
[22] Filed May 12, 1969
[45] Patented Sept. 21, 1971
[73] Assignee Phillips Petroleum Company

[54] FRACTIONATOR PRESSURE CONTROL SYSTEM
 8 Claims, 1 Drawing Fig.
[52] U.S. Cl...................................................... 203/1,
 203/2, 203/DIG. 18, 202/160, 62/21
[51] Int. Cl...................................................... B01d 3/42
[50] Field of Search............................................. 203/2, 1,
 DIG. 18; 196/141, 132; 62/21, 37; 202/160, 185,
 181; 165/38

[56] References Cited
UNITED STATES PATENTS

| | | | |
|---|---|---|---|
| 2,711,992 | 6/1955 | Kerner | 203/2 |
| 2,813,594 | 11/1957 | Gantt | 203/2 |
| 3,228,860 | 1/1966 | Larson | 196/132 |
| 3,304,727 | 2/1967 | Roskamp et al. | 203/2 |
| 3,332,856 | 7/1967 | Hart | 203/2 |
| 3,401,093 | 1/1968 | Cox | 203/2 |

Primary Examiner—Wilbur L. Bascomb, Jr.
Attorney—Young and Quigg

ABSTRACT: A method and apparatus for controlling the pressure within a fractionation column by regulating the rate of condensing, the liquid level height within the condenser and gas flow.

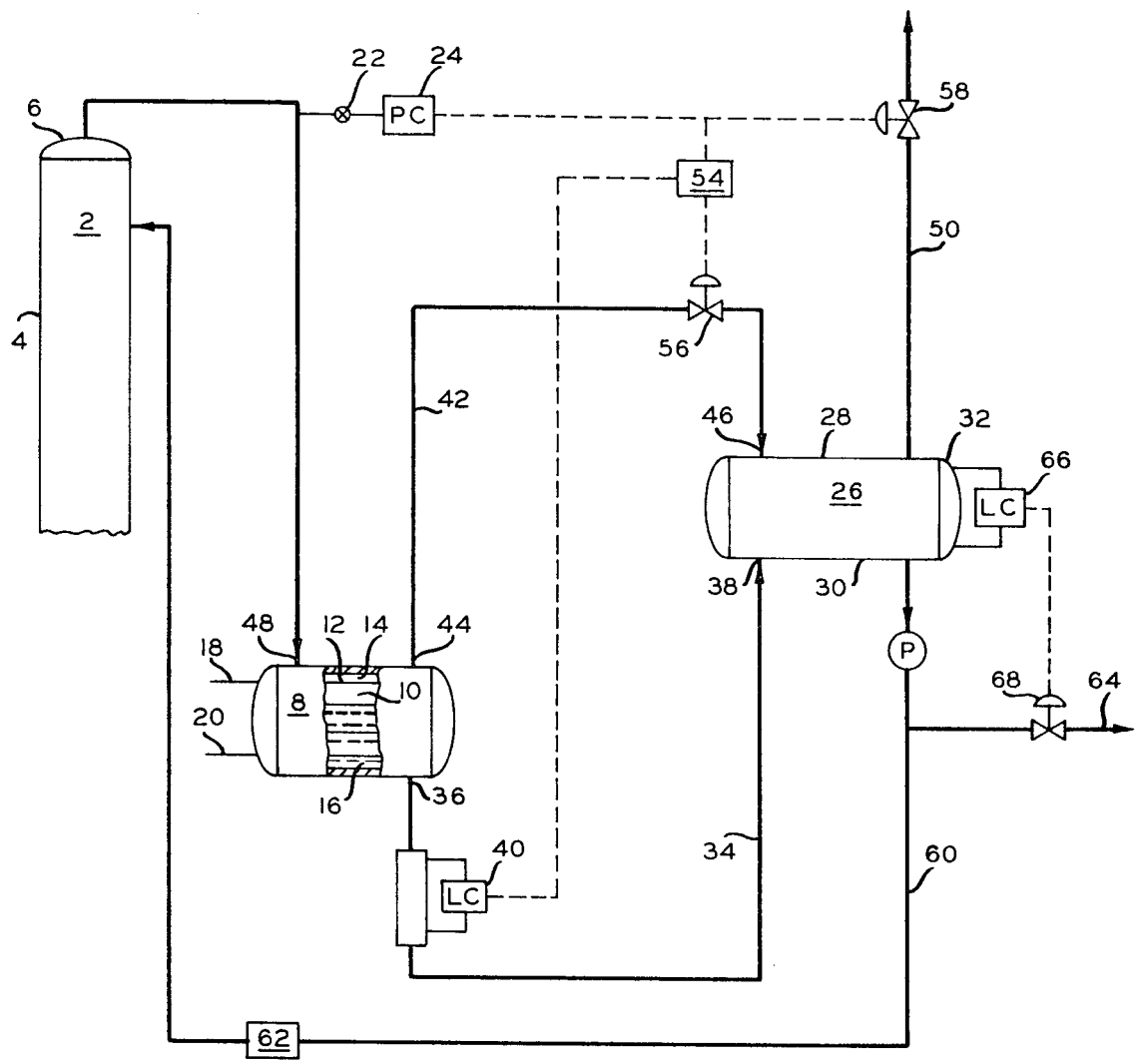

FRACTIONATOR PRESSURE CONTROL SYSTEM

This invention relates to control of fractional distillation. In one aspect it relates to control of the pressure within a fractional distillation column as a step in maintaining a predetermined and constant operation of said column. In another aspect it relates to method and apparatus comprising condensing overhead vapors flowing from the column, controlling the liquid level height within the condenser, and controlling gas flow through the system for maintaining a stable pressure within the fractionation column.

Prior fractional distillation art teaches use of back pressure regulators in overhead vapor lines at points relatively close to the fractionation column for controlling fractionation column pressure. However, such back pressure regulators require large control valves for passing the vapor stream at high flow rates. Previously used systems also position the condenser at elevations above the accumulator which utilizes additional equipment and complicates maintenance.

Attempts have also been made to maintain the pressure within the fractionation column by regulating the rate of withdrawal of liquid condensate from overhead condensers in response to column pressure. It has been noted however that noticeable pressure fluctuations within the fractionation column occur in these heretofore employed systems when the vapor stream discharging from the fractionation column contains a large percentage of noncondensible components. Said system also will not function properly when a change is made from total to partial condensing.

Accordingly, an object of this invention is to provide an improved fractionation pressure control system. Another object is to provide an improved fractionation pressure control system that will maintain the pressure within a fractionation column through which passes a fluid comprising a plurality of components in varying amounts. Yet another object is to provide a control system of the above described type comprising controlling the liquid level height in a condenser. A further object is to provide a control system of the above-described type which utilizes less equipment, equipment of reduced size, and reduced power requirements.

Still further objects and advantages of this invention will become apparent to those skilled in the art and from the following discussion, appended claims, and accompanying drawings in which the single FIGURE illustrates a preferred embodiment of the control system of this invention.

Referring to the drawing, a fractionation column 2, having a chamber (not shown), sidewalls 4, and an upper end 6 is positioned within a fluid stream. A condenser 8 having a chamber 10, cooling coils 12 within the chamber, and upper and lower portions 14, 16 is connected at the upper portion 14 to and in communication with the upper end 6 of the fractionation column 2 whereby a fluid stream discharging from the upper end 6 of the column flows into the chamber 10 of the condenser. Coolant discharging from a coolant supply source (not shown) flows through a first coolant conduit 18 into and through the cooling coils 12 of the condenser 8, and is discharged from said coils through a second coolant conduit 20. Although the fractionation column and condenser may be of other construction, it is preferred in this invention that the fractionation column be a vertical column and the condenser be a horizontal condenser positioned at or near the ground level.

A conventional pressure transmitter 22 is positioned within the vapor stream discharging from the column 2. That pressure transmitter 22 is adapted to measure the pressure of said vapor stream and deliver a signal responsive to and varying directly with said pressure. A conventional pressure controller 24 is connected to the pressure transmitter 22 and adapted to receive the signal from the pressure transmitter and deliver a signal, such as an electrical signal, preferably and hereafter referred to as a fluid signal, which is responsive to and varying directly with said received signal.

An accumulator 26 having upper and lower portions 28, 30, and end 32, and a chamber (not shown) is positioned at a higher elevation than the condenser 8.

A liquid conduit 34 having first and second ends, 36, 38 is attached at the first end 36 to and in communication with the lower portion 16 of the condenser 8 and at the second end 38 to and in communication with the lower portion 30 of the accumulator 26. A conventional liquid level controller 40 is associated with the liquid conduit 34 at a position lower in elevation than the condenser 8. The liquid level controller 40 is adapted to measure the height of a liquid level and deliver a signal, such as an electrical signal, preferably and hereafter referred to as a fluid signal, responsive to and varying directly with the height of said liquid level.

A first gas conduit 42 having first and second ends 44, 46 is attached at the first end to and in communication with the upper portion 14 of the condenser 8 spaced from the inlet 48 of the vapor stream and at the second end to and in communication with the upper portion 28 of the accumulator 26. A second gas conduit 50 is attached to and in communication with the accumulator 26 spaced from the inlet 46 of the gas stream from the condenser 8.

A pressure selector 54 is attached to the pressure controller 24 and the liquid level controller 40. The selector 54 is adapted to receive the signals from the pressure controller 24 and the liquid level controller 40. The selector 54 measures the two said signals, selects the lower of said signals, and delivers a signal, such as an electrical signal, preferably and hereinafter referred to as a fluid signal, responsive to and varying directly with said lower received signal.

A first regulating valve 56 which is a normally open valve, such as a fluid-operated valve, is positioned within the first gas conduit 42 and connected to the selector 54. The first valve 56 is adapted to receive the signal sent from the selector 54 and operate between a fully open position to a fully closed position in response to that signal. The valve 56, as previously mentioned, is constructed to be normally open. In addition, the valve is adapted to restrict the passage of gas therethrough in response to a received signal greater than 3 p.s.i.g. for example, progressively restrict the passage of gas therethrough in response and in direct proportion to an increase of the received signal, and fully restrict the passage of gas therethrough in response to a received signal having a pressure of 9 p.s.i.g. or greater, for example.

A second regulating valve 58 which is a normally closed valve, such as a fluid-operated valve, is positioned within the second gas conduit 50 and connected to the pressure controller 24. The second valve 58 is adapted to receive the signal sent from the pressure controller 24 and operate between a fully closed position to a fully open position in response to that signal. The second valve 58, as previously mentioned, is constructed to be normally closed. In addition, the valve is adapted to permit the passage of gas therethrough in response to a received signal greater than 9 p.s.i.g. progressively permit a greater passage of gas therethrough in response and in direct proportion to an increase of the received signal, and permit an unrestricted flow of gas therethrough in response to a received signal having a pressure of 15 p.s.i.g. or greater.

A reflux conduit 60 is attached to and in communication with the lower portion 30 of the accumulator 26 and the sidewall 4 of the column 2. A flow controller 62 is positioned within the reflux conduit for maintaining at a constant flow rate the liquid discharging from the accumulator 26, flowing through the reflux conduit 60, and entering the column 2. A product conduit 64 is attached to and in communication with the lower portion 30 of the accumulator 26 for removal of liquid from the accumulator and the system. An accumulator liquid level controller 66 is attached to and in communication with the accumulator 26 and is adapted to measure the liquid level within the accumulator and deliver a signal responsive to the height of that liquid level. A product valve 68 positioned within the product conduit and attached to the liquid level controller 66 is adapted to receive the signal from the liquid level controller 66 and regulate the flow of liquid from the accumulator 26 and from the system in response to that signal.

It should be understood that the pressure ranges and signaling strengths previously described comprise the preferred embodiment of this invention, but alterations in the control equipment can be made without departing from the scope of the invention. The following are examples of such alterations:

EXAMPLE I

| Pressure transmitter | Signal output varies inversely with the pressure input. |
|---|---|
| Pressure controller | Signal output varies inversely with the signal received. |
| First regulating valve | Normally open, operating pressure 3 to 9 p.s.i.g. |
| Second regulating valve | Normally closed, operating pressure 9 to 15 p.s.i.g. |
| Liquid level controller | Signal varies directly with the liquid level height. |
| Selector | Selects the lowest of the two signals received. |

EXAMPLE II

| Pressure transmitter | Signal output varies directly with the pressure input. |
|---|---|
| Pressure controller | Signal output varies inversely with the signal received. |
| First regulating valve | Normally closed, operating pressure 9 to 15 pounds. |
| Second regulating valve | Normally open, operating pressure 3 to 9 p.s.i.g. |
| Liquid level controller | Signal varies inversely with the liquid level height. |
| Selector | Selects the highest of the two signals received. |

EXAMPLE III

| Pressure transmitter | Signal output varies inversely with the pressure input. |
|---|---|
| Pressure controller | Signal output varies directly with the signal received. |
| First regulating valve | Normally closed, operating pressure 9 to 15 p.s.i.g. |
| Second regulating valve | Normally open, operating pressure 3 to 9 p.s.i.g. |
| Liquid level controller | Signal varies inversely with the liquid level height. |
| Selector | Selects the highest of the two signals received. |

The operating pressure ranges of the valves can also be narrowed or widened so long as the maximum pressure chosen for the low operating pressure regulating valve is the minimum pressure chosen for the high operating pressure regulating valve. It should likewise be understood that electrically operated regulating valves may be employed in this invention.

In the operation of the pressure control system of this invention under total condensing circumstances, vapor is flowing from the column 2 into the condenser 8. The pressure within the vapor stream flowing from column 2 is substantially identical to the pressure within the column. The pressure controller will be constructed and calibrated so that the pressure of the column under total condensing conditions will cause the pressure controller to deliver a signal below 9 p.s.i.g., for example. Since the signal from the pressure controller is below 9 p.s.i.g. during total condensing operations, the second regulating valve 58 will remain closed and all vapors discharging from the column 2 will be directed through the condenser 8 and controlled by signals from the pressure controller 24.

The vapors enter the condenser 8 through inlet 48 and flow through the chamber 10 in contact with cooking coils 12. Coolant flowing through the cooling coils 12 lowers the temperature of the vapors within the condenser 8 and cause condensation of a portion of said vapors. The condensate thereafter settles in the condenser 8. The remaining uncondensed gases discharge from the condenser 8, flow through the first gas conduit 42 and into the accumulator 26.

Liquid condensed from the vapor stream in the condenser 8 discharge from the condenser into liquid conduit 34 which is in communication with the accumulator 26. Liquid within the accumulator 26 is continuously withdrawn into reflux conduit 60 and discharged into the column 2 at a constant rate.

During normal total condensing operation of the system, the pressure or the vapor stream and the liquid within the condenser 8 will oppose the gas pressure and the liquid head of the accumulator 26 and maintain the liquid level within the condenser 8. The signal delivered by the pressure controller 24 is the lower of the two signals under these conditions and maintains the first regulating valve 56 in an open position. The cooling coils 12 within the condenser 8 are partially covered and condensing of the vapor stream is occurring.

An example of the operating pressures of this system under total condensing operations is as follows:

| Column Pressure | 150 p.s.i. |
|---|---|
| Signal delivered by pressure controller | 8 p.s.i. |
| Signal delivered by liquid level controller | 15 p.s.i. |
| Pressure selected and delivered by selector | 8 p.s.i. |
| Valve 56 | Partially closed |
| Valve 58 | Closed |

From this stable operating condition wherein the pressure of the fractionation column is constant, we can consider a change in the composition or charge rate of the feed stream into the column which tends to decrease the pressure therein. An incremental decrease in pressure within the column 2 causes the pressure within the upper portion 14 of the condenser 8 to also decrease in incremental amount. However, simultaneously with the vapor stream incremental decrease in pressure in the condenser 8, liquid flows by gravity from the accumulator 26 into the condenser thereby maintaining the pressure within the column 2 and the condenser. Correspondingly with the flowing of liquid from the accumulator into the condenser 8, more cooling coils 12 are covered by liquid and less cooling and condensing is occurring within the condenser. With decreased condensing of the vapor stream, the pressure of the vapor stream is maintained proportionally.

In the event decreasing of pressure within the column 2 is of such serious nature or extended duration that flooding of the condenser 8 and reduced condensing does not maintain the column pressure, the signal delivered by the pressure controller 24, hence the selector, decreases causing the regulating valve to further open and pass gas at a higher rate into the accumulator. Increased gas flow rate into the accumulator 26 increases the pressure above the liquid and forces liquid from the accumulator and into the condenser 8 at a higher rate thereby maintaining the pressure within the column 2.

After the conditions causing column pressure decrease have been corrected and pressure within the column 2 begins to increase, column pressure is maintained as previously described, but in reverse.

Often in the operation of a fractionation column, the flow rate of noncondensible components into the accumulator increases and/or the volume of the vapor stream increases. These events and others tend to cause a pressure increase within the fractionation column. As the pressure increases an incremental amount within the column 2 hence the condenser 8, liquid is forced from the condenser and into the accumulator 26. Lowering of the liquid height within the condenser uncovers additional cooling coils 12, increases the rate of condensation and maintains the pressure within the column 2 by a simultaneous decrease of liquid volume and an increase of condensation rate.

In the event the increase of pressure within the column 2 is of a serious nature or extended duration, the pressure controller 24 delivers a signal 9 p.s.i.g. or larger which actuates the second gas-regulating valve 58 and reduces the pressure within the accumulator 26. Reducing the pressure within the accumulator 26 increases the flow rate of liquid from the condenser 8 into the accumulator 26, lowers the liquid within the condenser and permits maximum condensing thereby maintaining the pressure within the column 2. After reaching maximum condensing conditions, further reduction in liquid level actuates liquid level controller 40 to vent noncondensables from the condenser 8 through conduit 42 and valve 56 to the accumulator 26.

An example of the operating pressures of this system under serious or extended column pressure increases is as follows:

| | |
|---|---|
| Column pressure | 155 p.s.i. |
| Signal delivered by pressure controller | 11 p.s.i. |
| Signal delivered by liquid level controller | 7 p.s.i. |
| Pressure selected and delivered by selector | 7 p.s.i. |
| Valve 56 | Partially open |
| Valve 58 | Partially open |

As the concentration of noncondensable components flowing into the accumulator decreases or the discharge rate from the column 2 becomes lower, the first operation of the controlling device of this invention is the closing of the first regulating valve 56. Therefore, only a minimum amount of gas bypasses the condenser 8 which results in recovery of maximum condensates while maintaining the pressure within the column 2.

Various modifications and alterations of this invention will become apparent to those skilled in the art from the foregoing discussion, example, and accompanying drawing, and it should be understood that this invention is not to be unduly limited thereto.

That which is claimed:

1. An apparatus for controlling the pressure within a fractionation column, comprising:
   a fractionation column;
   a condenser;
   means for passing a vapor stream from the column into the condenser;
   control means for measuring the pressure of the vapor stream and delivering a signal responsive to said pressure;
   an accumulator positioned at a higher elevation than the condenser;
   a liquid conduit attached to the condenser and the accumulator for the passage of liquid therebetween;
   a liquid level controller connected to the liquid conduit adapted to deliver a signal responsive to the height of the liquid;
   a first gas conduit attached to the condenser and the accumulator for the passage of gas from the condenser to the accumulator;
   a second gas conduit attached to the accumulator for the passage of gas from the accumulator;
   selector means attached to the control means and the liquid level controller for receiving the signals therefrom, measuring the received signals, selecting the lower signal, and delivering a signal responsive to said lowest received signal;
   a normally open regulating valve within the first gas conduit, connected to the selector means, and operable in response to the signal received from said selector means for controlling the pressure within the condenser and the column; and
   a normally closed regulating valve within the second gas conduit, connected to the controlling means, and operable in response to the signal received from said controlling means for controlling the pressure within the accumulator, the condenser, and the column.

2. An apparatus, as set forth in claim 1, wherein the condenser has cooling coils therein, the signal delivered by the controlling means varies directly with the pressure within the column the signal delivered by the liquid level controller varies directly with the height of the liquid level, the first regulating valve is normally open, and the second regulating valve is normally closed.

3. An apparatus, as set forth in claim 1, wherein a reflux conduit is connected to the accumulator and to the column for the passage of liquid from the accumulator to the column.

4. An apparatus, as set forth in claim 1, wherein the controlling means comprises a pressure transmitter and a pressure controller.

5. An apparatus for controlling the pressure within a fractionation column, comprising:
   a fractionation column having a chamber, sidewalls, and an upper end;
   a condenser having a chamber, cooling coils within the chamber, and upper and lower portions are connected at the upper portion to and in communication with the upper end of the fractionation column for the removal of liquid from a vapor stream discharging from the column and into the condenser;
   a pressure transmitter positioned within the vapor stream discharging from the column adapted to measure the pressure within said vapor stream and deliver a signal responsive and directly proportional to said pressure;
   a pressure controller connected to the pressure transmitter adapted to receive the signal from the pressure controller and deliver a fluid signal responsive and directly related to said received signal;
   an accumulator having upper and lower portions, an end, and a chamber and being positioned at a higher elevation than the condenser;
   a liquid conduit having first and second ends attached at the first end to and in communication with the lower portion of the condenser and at the second end to and in communication with the lower portion of the accumulator for the passage of liquid therebetween and the control of pressure within the condenser and the column;
   a liquid level controller connected to the liquid conduit at a lower elevation than the condenser adapted to measure the height of a liquid level and deliver a fluid signal and directly related to the height of said liquid level;
   a first gas conduit having first and second ends attached at the first end to and in communication with the upper portion of the condenser spaced from the inlet of the vapor stream and at the second end to and in communication with the upper portion of the accumulator for the flow of gas from the condenser to the accumulator;
   a second gas conduit attached to and in communication with the accumulator spaced from the inlet of the gas stream from the condenser for the passage of gas from the accumulator;
   means attached to the pressure controller and the liquid level controller adapted to receive the fluid signals from the pressure controller and the liquid level controller, measure said signals, select the lowest of the signals received, and deliver a fluid signal responsive and directly proportional to said lowest received signal;
   a first regulating valve which is normally open positioned within the first gas conduit, connected to the selector means adapted to receive the fluid signal from the selector, restricting the passage of gas therethrough in response to a received fluid signal greater than 3 p.s.i.g., progressive; restricting the passage of gas therethrough in direct proportion to an increase of the received fluid signal, and fully restricting the passage of gas in response to a received fluid signal having a pressure in the range of 9 p.s.i.g. or greater for controlling the flow rate of the gas flowing from the column, the condenser to the accumulator, and controlling the pressure within the column;
   a second regulating valve which is normally closed positioned within the second gas conduit, connected to the pressure controller adapted to receive the fluid signal from the pressure controller, permitting the passage of gas therethrough in response to a received fluid signal greater than preset pressure, permitting a progressively greater passage of gas therethrough in direct proportion to the increase of the received fluid signal for controlling the flow rate of the gas flowing from the accumulator, condenser, and the column and controlling the pressure within the column;

reflux conduit attached to and in communication with the lower portion of the accumulator and a sidewall of the column for the flow of liquid for reflux from the accumulator into the column;

means within the reflux conduit for controlling the flow rate of liquid from the accumulator to the column and controlling the temperature and pressure within the column;

product conduit attached to and in communication with lower portion of the accumulator for the removal of liquid from the accumulator and the system;

a liquid level controller attached to and in communication with the accumulator adapted to measure the liquid level within the accumulator and deliver a signal responsive to the height of the liquid level; and control means attached to the accumulator liquid level controller and the product conduit adapted to receive the signal from said liquid level controller and regulate the flow of liquid from the accumulator and the system for controlling the pressure within the accumulator, the condenser, and the column.

6. A method for controlling the pressure within a fractionation column, comprising;

passing a vapor stream from the fractionation column to a condenser;

monitoring the pressure of the vapor stream;

extracting liquid from the vapor stream;

passing the extracted liquid between the condenser and an accumulator for regulating the rate of condensing and maintaining the pressure within the column;

monitoring the liquid level height of the extracted liquid;

discharging gas from the condenser, through control means, and into the accumulator;

regulating the flow rate of gas from the condenser in response to the pressure of the vapor stream and the liquid level height for maintaining the pressure within the column; and intermittently discharging gas from the accumulator and through a regulating valve in response to the pressure of the vapor stream for maintaining the pressure within the column.

7. A method as set forth in claim 6, wherein passing of liquid from the accumulator to the condenser is by gravity flow or gravity flow and gas pressure within the accumulator and passing of liquid from the condenser to the accumulator is by gas pressure within the condenser.

8. A method, as set forth in claim 6, wherein liquid is continuously discharged from the accumulator.